United States Patent
Hitzel et al.

(10) Patent No.: US 10,953,858 B2
(45) Date of Patent: Mar. 23, 2021

(54) METHOD FOR OPERATING A BRAKE SYSTEM

(71) Applicant: Continental Teves AG & Co. oHG, Frankfurt am Main (DE)

(72) Inventors: Michael Hitzel, Rödermark (DE); Ulfilas Hoffmann, Mesekenhagen (DE); Tobias Scheller, Hofbieber (DE); Daniel Kosshof, Idstein (DE); Ansgar Hoffmann, Frankfurt am Main (DE)

(73) Assignee: Continental Teves AG & Co. oHG

( * ) Notice: Subject to any disclaimer, the term of this patent is extended or adjusted under 35 U.S.C. 154(b) by 52 days.

(21) Appl. No.: 16/335,420

(22) PCT Filed: Sep. 20, 2017

(86) PCT No.: PCT/EP2017/073708
§ 371 (c)(1),
(2) Date: Mar. 21, 2019

(87) PCT Pub. No.: WO2018/054937
PCT Pub. Date: Mar. 29, 2018

(65) Prior Publication Data
US 2019/0283723 A1    Sep. 19, 2019

(30) Foreign Application Priority Data
Sep. 23, 2016   (DE) .............. 10 2016 218 337.0

(51) Int. Cl.
*B60T 8/48*     (2006.01)
*B60T 8/36*     (2006.01)
(Continued)

(52) U.S. Cl.
CPC .............. *B60T 8/36* (2013.01); *B60T 8/3275* (2013.01); *B60T 8/348* (2013.01); *B60T 8/4872* (2013.01); *B60T 2270/414* (2013.01)

(58) Field of Classification Search
CPC .......... B60T 8/265; B60T 8/268; B60T 8/306; B60T 8/3255; B60T 8/3275; B60T 8/348;
(Continued)

(56) References Cited

U.S. PATENT DOCUMENTS 5,299,858 A * 4/1994 Beck ..................... B60T 8/4872
                                                         303/113.2
5,697,680 A * 12/1997 Tanaka .................... B60T 8/348
                                                         303/125

(Continued)

FOREIGN PATENT DOCUMENTS

DE    19725239 A1    12/1998
DE    10320521 A1    11/2004
(Continued)

OTHER PUBLICATIONS

English Translation of the Written Opinion for International Application No. PCT/EP2017/073708, dated Nov. 30, 2017—8 pages.
(Continued)

*Primary Examiner* — Bradley T King
*Assistant Examiner* — Stephen M Bowes
(74) *Attorney, Agent, or Firm* — RatnerPrestia

(57) ABSTRACT

A method for operating a brake system, wherein two switching valves arranged on the suction side of pumps are opened and closed in an alternating manner in order to reduce current consumption.

18 Claims, 1 Drawing Sheet

(51) Int. Cl.
*B60T 8/32* (2006.01)
*B60T 8/34* (2006.01)

(58) Field of Classification Search
CPC ........ B60T 8/36; B60T 8/4031; B60T 8/4059; B60T 8/4872; B60T 2270/414
See application file for complete search history.

(56) References Cited

U.S. PATENT DOCUMENTS

| | | |
|---|---|---|
| 9,522,668 B2 | 12/2016 | Oosawa et al. |
| 2004/0262988 A1 | 12/2004 | Kolarsky et al. |
| 2007/0262638 A1* | 11/2007 | Kodama ............... B60T 8/4872 303/9.62 |
| 2012/0299367 A1* | 11/2012 | Ross ..................... B60T 8/4872 303/3 |
| 2013/0140115 A1 | 6/2013 | Gronau |
| 2015/0367823 A1* | 12/2015 | Benzler ................ B60T 8/4031 303/10 |
| 2015/0367828 A1* | 12/2015 | Oosawa ................ B60T 8/4081 303/6.01 |
| 2018/0050678 A1* | 2/2018 | Wolff .................... B60T 17/226 |

FOREIGN PATENT DOCUMENTS

| | | |
|---|---|---|
| DE | 102009052485 A1 | 5/2011 |
| GB | 2321684 A | 8/1998 |
| JP | 2014151806 A | 8/2014 |
| KR | 20130067278 A | 6/2013 |
| WO | 2010079011 A1 | 7/2010 |

OTHER PUBLICATIONS

Korean Notice of Grounds for Rejection for Korean Application 10-2019-7008360, dated Feb. 14, 2020, with translation, 20 pages.
International Search Report and Written Opinion for International Application No. PCT/EP2017/073708, dated Nov. 30, 2017—12 pages.

* cited by examiner

METHOD FOR OPERATING A BRAKE SYSTEM

CROSS REFERENCE TO RELATED APPLICATIONS

This application is the U.S. National Phase Application of PCT International Application No. PCT/EP2017/073708, filed Sep. 20, 2017, which claims priority to German Patent Application No. 10 2016 218 337.0, filed Sep. 23, 2016, the contents of such applications being incorporated by reference herein.

FIELD OF THE INVENTION

The invention relates to a method for operating a brake system of a motor vehicle.

BACKGROUND OF THE INVENTION

Such a brake system typically has a first hydraulic circuit, a second hydraulic circuit and a master brake cylinder. The master brake cylinder is typically used to build up pressure in the hydraulic circuits so that a brake can be actuated. For this purpose, the master brake cylinder is typically actuated by a brake pedal.

Such two-circuit brake systems are nowadays standard in most motor vehicles. It is particularly ensured thereby that, in the event of failure of one hydraulic circuit, a further hydraulic circuit is still available. For example, one hydraulic circuit can act on the front wheels and another hydraulic circuit can act on the rear wheels, or the hydraulic circuits can act in a crosswise manner.

The increase of functionalities which are intended to be executed in an automated manner in vehicles or which serve to assist the driver means that it has been typically required in the meantime for a pump to be present in each case in the hydraulic circuits, which pump can build up pressure independently of the master brake cylinder. Such pumps are typically operated by electric motors.

Such electric motors are typically supplied via an electrical system of the vehicle, accordingly result in an increased current consumption and must also be taken into consideration in the design of the electrical system.

Typically, a functionality of an antilocking system is present in a brake system which is configured as described. This particularly ensures that locking of wheels during braking is avoided.

Recently, however, emergency brake assists are increasingly also installed, which can also be referred to as automatic emergency brake (AEB).

The introduction of emergency brake assists means that the characteristics of the installed pumps and electric motors have changed insofar as, for emergency brake assists, considerably higher volumetric flows of the respective pump are required. Pump size and motor design are typically adapted as a consequence. Particularly in the pressure range of approximately 0 to 100 bar that is relevant for emergency brake assists, such pumps have a considerably higher pumping power which is required for the rapid pressure buildup for emergency braking. This also necessarily results in a substantially higher pumping power at the operating point at 200 bar, which is relevant for antilocking systems (ABS). However, this pumping power is functionally not required at all for the functionality of an antilocking system. However, it leads to a higher current requirement, which also has to be taken into consideration in the design of the vehicle electrical system.

SUMMARY OF THE INVENTION

It is therefore desirable to reduce the current requirement without influencing the described functionalities, in particular the functionality of an antilocking system.

An aspect of the invention relates to a method for operating a brake system of a motor vehicle. The brake system has a first hydraulic circuit, a second hydraulic circuit and a master brake cylinder.

With respect to the functionalities, reference may particularly also be made here to the description already given at the outset.

The first hydraulic circuit has at least a first hydraulic pump, a first low-pressure accumulator, a first nonreturn valve and a first switching valve, wherein the first low-pressure accumulator is connected via the first nonreturn valve to a first suction port of the first hydraulic pump, with the result that a throughflow direction of the first nonreturn valve is directed toward the first suction port, and wherein the master brake cylinder is connected via the first switching valve to the first suction port.

The second hydraulic circuit has at least a second hydraulic pump, a second low-pressure accumulator, a second nonreturn valve and a second switching valve, wherein the second low-pressure accumulator is connected via the second nonreturn valve to a second suction port of the second hydraulic pump, with the result that a throughflow direction of the second nonreturn valve is directed toward the second suction port, and wherein the master brake cylinder is connected via the second switching valve to the second suction port.

During continuous running of the first hydraulic pump and the second hydraulic pump, the first switching valve and the second switching valve are opened and closed in an alternating manner to one another.

The way in which the method is conducted according to an aspect of the invention ensures that the pumping powers of the two hydraulic pumps are expediently distributed. It can be stated for example that the hydraulic pumps are alternately operated, with the result that overall each hydraulic pump provides only approximately half the pumping power since it is operated only approximately for half the time. This allows a correspondingly lower current consumption to be achieved since the pumping power is correspondingly lower than if both hydraulic pumps were to operate fully. However, the lower pumping power is typically sufficient for the functionality of an antilocking system.

The first hydraulic pump and the second hydraulic pump are preferably driven by a single motor, in particular by an electric motor.

The method can be carried out particularly during an antilocking system engagement. This can occur in particular at an operating point of 150 bar to 250 bar, preferably 200 bar. The method has proved to be particularly advantageous for such a functionality since it saves current and allows a smaller design of the vehicle electrical system.

The first switching valve and the second switching valve are preferably switched in an alternating manner in such a way that one of the switching valves is always open and the other of the switching valves is always closed. Consequently, the motor power acting on both hydraulic pumps is switched so as to ever only act on one hydraulic pump. The loading of the motor and thus the current consumption are thus reduced.

According to one embodiment, the switching valves are switched in such a way that they are in each case open and closed for equally long times. It is thus possible in particular for an identical delivery power of the hydraulic pumps to be achieved. However, this can also be achieved in some other way, for example. However, it should be understood that different times can also be used in which the respective switching valves are open and closed in order to adapt the way in which the method is conducted to certain requirements.

For example, the switching valves can be switched in such a way that the first switching valve is in each case open for a shorter time than the second switching valve.

This can particularly be applied when, for the same speed, the second hydraulic pump has a higher delivery power than the first hydraulic pump.

For example, in this case, the second switching valve can in each case be open for twice as long as the first switching valve.

The times in which the switching valves are open or closed can be calculated in particular on the basis of a volume model. This has proved to be a good model in practice in order to expediently carry out the method.

For example, it has proved advantageous if the first switching valve and/or the second switching valve are or is in each case open for 100 ms to 200 ms, preferably 150 ms.

Each outlet pump preferably has a respective outlet port which is in each case connected to a number of brake cylinders of the respective hydraulic circuit. The braking force can be transmitted through the brake cylinders to brake pads or brake shoes or other braking devices, with the result that they can brake the vehicle. By virtue of the connection just described, the hydraulic pump can actuate the brake cylinders in that it pumps a fluid or a brake fluid into them. An emergency braking function can thus be realized, for example.

In each case an inlet valve is preferably arranged between the outlet port and each brake cylinder, and the inlet valves are preferably connected via an isolation valve to the master brake cylinder so as to be situated opposite to the respective brake cylinder. The inlet valves and the isolation valves can be used in particular for controlling the fluid flow, for example for the typical implementation of an antilocking system engagement.

Each brake cylinder is preferably connected via a respective outlet valve to the respective low-pressure accumulator of its hydraulic circuit. Excess fluid can thus be fed into the low-pressure accumulator. The respective hydraulic pump can preferably suck required fluid out of the low-pressure accumulator.

According to one embodiment, the method can be applied in principle, that is to say always during operation of a vehicle or upon actuation of the corresponding hydraulic pumps or when carrying out an antilocking system engagement.

However, there can also be provision that the method is applied in response to a supply voltage lying below a first threshold value, to a temperature of one or both of the hydraulic pumps lying about a second threshold value, or to a current of a motor, which drives the hydraulic pumps, lying above a third threshold value. In this case, the application of the method can be limited to cases in which an excessive current would lead to particular problems. Otherwise, the application of the method can be dispensed with, that is to say, for example, an antilocking system engagement or another engagement can be carried out without an alternating switching of the hydraulic pumps taking place, with the result that more volumetric flow is available.

In particular, a respective hydraulic circuit can be short-circuited by opening a switching valve. As a result, the corresponding fluid is ultimately pumped into the circuit, which occurs virtually without resistance.

The first hydraulic pump and the second hydraulic pump are preferably connected to different fluid reservoirs of the master brake cylinder. This corresponds to the customary design of a two-circuit brake system, with the result that, in the event of failure of one circuit, the other circuit is adversely affected as little as possible, if at all. However, there can alternatively also be provision that the first hydraulic pump and the second hydraulic pump are connected to the same fluid reservoir of the master brake cylinder.

It may be stated, for example, that, in order to reduce the current requirement, the excessively installed pumping power is short-circuited at high pressures. A pump circuit can in each case be short-circuited by opening a switching valve or EUV valve. As a result, a driver can act on the pump and close the pressure holdback valve, with the result that the emptying of the low-pressure accumulator is briefly interrupted. As a result, the current consumption is reduced by comparison with both-circuit delivery. If this procedure is alternated in rapid succession in both circuits, the low-pressure accumulators of both circuits are, during an ABS control, not, as hitherto, simultaneously emptied by the return pump, but sequentially, for example every 150 ms in alternation. However, as seen over a relatively long time period, the low-pressure accumulators are emptied at least equally quickly as in a reference system with a small pump, with the result that, functionally, no losses can be expected in relation to the prior art.

The method can be applied generally, or it can be linked to certain boundary conditions. For example, it can be applied at a low vehicle electrical system voltage, that is to say only a small pump speed will be possible, and therefore the emptying of the low-pressure accumulators lasts considerably longer. This would lead to a long and high current loading.

The method can be applied in particular at a high temperature, with it being noted that a motor is weakened by high temperature, with the result that the emptying of the low-pressure accumulator also lasts correspondingly longer, which can lead to a long and high current loading.

In the case of actually recognized high currents, which can be measured, for example, by corresponding sensor units, this method can react to the high current requirement as a special measure.

The ratio of the emptying times of both brake circuits can be adapted to the circuit splitting. In the case of diagonally split vehicles, particularly an identical delivery duration for both circuits can make sense. For vehicles split black and white in which thus one brake circuit acts on the front wheels and a further brake circuit acts on the rear wheels, it is possible, for example, for the front axle to account for ⅔ of the time and the rear axle ⅓ of the time, specifically on account of the different volume turnover. The times can also be linked to a volume module of a control software.

An aspect of the invention further relates to a device, in particular a brake system, which is configured to carry out a method according to an aspect of the invention. In this respect, it is possible in particular for all the features described herein to be realized as device features. An aspect of the invention additionally relates to a nonvolatile, computer-readable storage medium on which program code is stored, during the execution of which a computer carries out a method according to an aspect of the invention. In respect of the method according to an aspect of the invention, reference can be made here in each case to all of the described embodiments and variants.

BRIEF DESCRIPTION OF THE DRAWINGS

Further features and advantages will be gathered by a person skilled in the art from the exemplary embodiment described below with reference to the appended drawing, in which:

The FIGURE shows a brake system for carrying out the method according to an aspect of the invention.

DETAILED DESCRIPTION OF THE PREFERRED EMBODIMENTS

Figure 1:
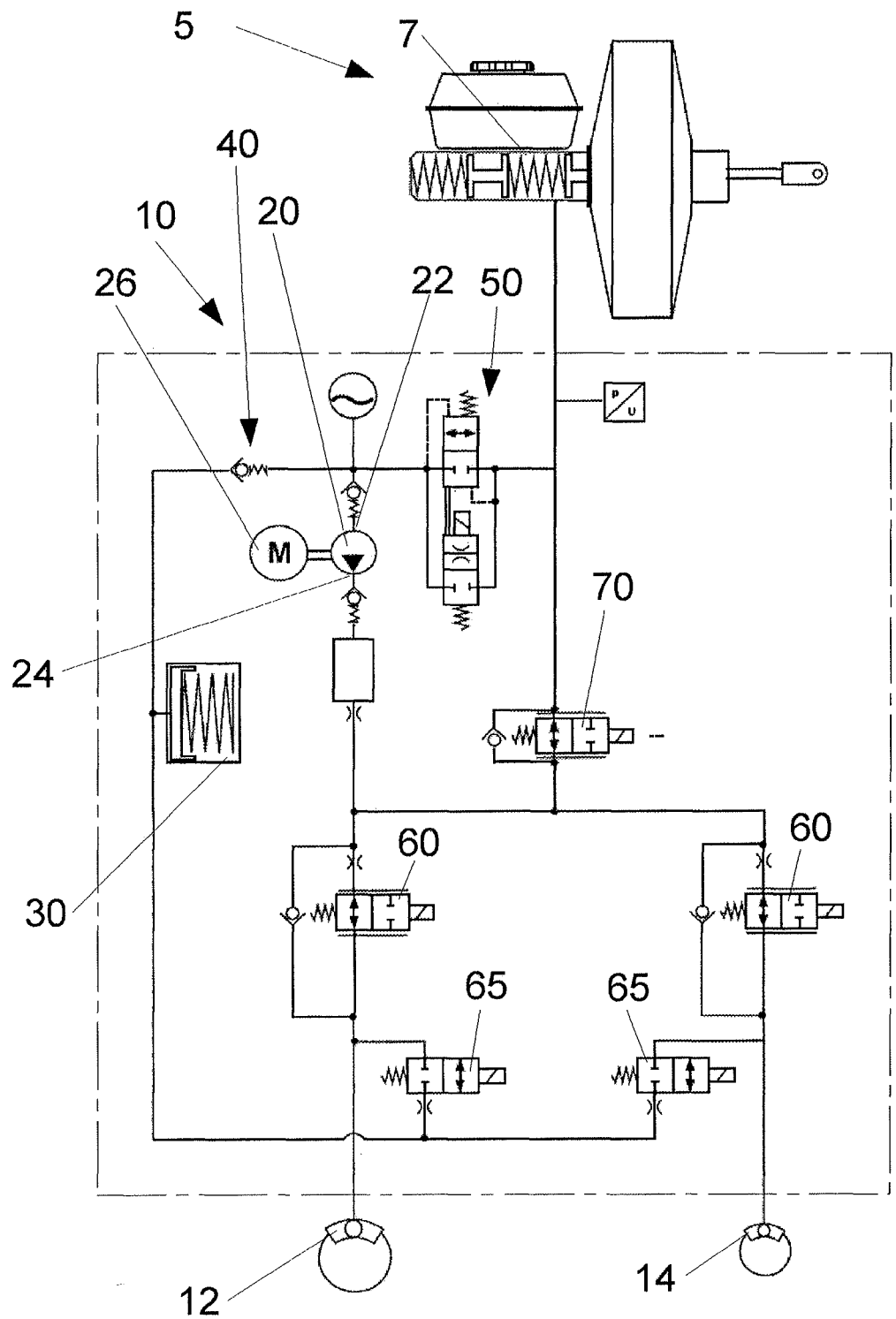

The FIGURE shows a brake system or a detail of a brake system which is designed for carrying out a method according to an aspect of the invention according to an exemplary embodiment. The method according to an aspect of the invention is described with reference to this FIGURE.

The brake system illustrated in the FIGURE has a master brake cylinder 5. The main brake cylinder 5 has a first fluid reservoir 7.

The brake system further has a first hydraulic circuit 10. It additionally has a second hydraulic circuit. The second hydraulic circuit is not illustrated in the FIGURE. Only illustrated, rather, is the first hydraulic circuit 10 which is connected to the already mentioned first fluid reservoir 7. It should be understood that the master brake cylinder 5 further has a second fluid reservoir which is not illustrated or not explicitly described and which is connected to the second hydraulic circuit (not shown).

The second hydraulic circuit (not shown) has substantially the same or a similar functionality as the illustrated first hydraulic circuit 10 described below. Corresponding differences or relationships will be discussed where appropriate.

The first hydraulic circuit 10 has a first hydraulic pump 20. The first hydraulic pump 20 has a suction port 22 and an outlet port 24. It is designed to pump a brake fluid or a fluid from the suction port 22 to the outlet port 24. For this purpose, it is coupled to a motor 26, wherein the motor 26 drives not only the hydraulic pump 20, illustrated in the FIGURE, of the first hydraulic circuit 10 but also a hydraulic pump (not shown) of the second hydraulic circuit.

The first hydraulic circuit 10 further has a first low-pressure accumulator 30. The first low-pressure accumulator 30 serves as an intermediate reservoir within the first hydraulic circuit 10.

A first nonreturn valve 40 is arranged between the first low-pressure accumulator 30 and the suction port 22. This ensures that the brake fluid can flow only in the direction from the first low-pressure accumulator 32 to the suction port 22, but not in reverse.

The suction port 22 of the first hydraulic pump 20 is further connected via a first switching valve 50 to the first fluid reservoir 7 of the master brake cylinder 5. The first switching valve 50 is an electrically actuatable valve by means of which the connection can be opened and closed.

The outlet port 24 of the first hydraulic pump 20 is connected to two inlet valves 60, which in turn are connected to in each case a brake cylinder 12, 14. In the present case here, a design is chosen in which a first brake cylinder 12 operates the front left wheel and a second brake cylinder 14 operates the rear right wheel. It should be mentioned that, correspondingly, the second hydraulic circuit, which is not illustrated, likewise has two brake cylinders which operate the front right and the rear left wheel. Such a design is particularly advantageous for vehicles having front-wheel drive.

The pressure generated by the hydraulic pump 20 can be channeled via the inlet valves 60 to the brake cylinders 12, 14, with the result that they can carry out a braking operation.

As shown, the two inlet valves 60 are also connected to a first isolation valve 70, which in turn is connected to the first fluid reservoir 7 of the master brake cylinder 5. Consequently, a pressure which is generated by the master brake cylinder 5 and which is typically generated by a driver actuating a brake pedal can also be channeled via the two inlet valves 60 to the two brake cylinders 12, 14.

The two brake cylinders 12, 14 are connected via in each case an outlet valve 65 to the low-pressure accumulator 30. In the case that an antilocking system engagement occurs, this allows pressure to be reduced in a targeted manner in the two brake cylinders 12, 14 by opening the outlet valves 65 and to be channeled away into the low-pressure accumulator 30. As a result, locking of the wheels can be prevented.

This fluid or the brake fluid is then pumped back again out of the first low-pressure accumulator 30 by the first hydraulic pump 20.

The motor 26 and the first hydraulic pump 20 are dimensioned in such a way that the delivery power of the first hydraulic pump 20 at the operating pressure of approximately 200 bar that is typical for such engagements is considerably higher than necessary. This is because the first hydraulic pump 20 and the motor 26 are designed in the present case for the system also to be able to implement an emergency braking function in which the vehicle has to be braked to a standstill in an automated manner. Such an emergency braking function typically occurs at a pressure of approximately 100 bar, whereas the pressure used during an antilocking system engagement is approximately 200 bar. However, the high delivery power achievable here is not required at all.

In order in this situation to save current and to allow a weaker design of a vehicle electrical system, the first switching valve 50 and a second switching valve (not shown) of the second hydraulic circuit (not shown) are continuously switched in an alternating manner, with the result that one of the two hydraulic circuits is always short-circuited in alternation. The respective hydraulic pump of the short-circuited hydraulic circuit then no longer pumps any brake fluid from the respective low-pressure accumulator, but merely pumps it in the circuit, which occurs virtually without resistance This means that only ever one of the two hydraulic pumps of the brake system illustrated in the FIGURE actually provides a delivery power, with the result that the current consumption of the motor 60 is considerably reduced.

Mentioned steps of the method according to an aspect of the invention can be executed in the indicated order. However, they can also be executed in a different order. In one of its embodiments, for example with a specific combination of steps, the method according to an aspect of the invention can be executed in such a way that no further steps are executed.

However, in principle, further steps can also be executed, even steps of a kind which have not been mentioned.

The claims that are part of the application do not represent any dispensing with the attainment of further protection.

If it turns out in the course of the proceedings that a feature or a group of features is not absolutely necessary, then the applicant aspires right now to a wording for at least one independent claim that no longer has the feature or the group of features. This may be, by way of example, a subcombination of a claim present on the filing date or may be a subcombination of a claim present on the filing date that is limited by further features. Claims or combinations of features of this kind requiring rewording can be understood to be covered by the disclosure of this application as well.

It should further be pointed out that configurations, features and variants of aspects of the invention that are described in the various embodiments or exemplary embodiments and/or shown in the FIGURES can be combined with one another in any way. Single or multiple features can be interchanged with one another in any way. Combinations of features arising therefrom can be understood to be covered by the disclosure of this application as well.

Back-references in dependent claims are not intended to be understood as dispensing with the attainment of independent substantive protection for the features of the back-referenced subclaims. These features can also be combined with other features in any way.

Features that are disclosed only in the description or features that are disclosed in the description or in a claim only in conjunction with other features may fundamentally be of independent significance essential to aspects of the invention. They can therefore also be individually included in claims for the purpose of distinction from the prior art.

The invention claimed is:

1. A method for operating a brake system of a motor vehicle, comprising:
    a first hydraulic circuit,
    a second hydraulic circuit, and
    a master brake cylinder,
    wherein the first hydraulic circuit has at least a first hydraulic pump and a first switching valve, and the master brake cylinder is connected via the first switching valve to a first suction port of the first hydraulic pump,
    wherein the second hydraulic circuit has at least a second hydraulic pump and a second switching valve, and the master brake cylinder is connected via the second switching valve to a second suction port of the second hydraulic pump, and
    wherein, during continuous running of the first hydraulic pump and the second hydraulic pump, the first switching valve and the second switching valve are opened and closed in an alternating manner to one another.

2. The method as claimed in claim 1, wherein the first hydraulic pump and the second hydraulic pump are driven by a single motor.

3. The method as claimed in claim 2, wherein the motor is an electric motor.

4. The method as claimed in claim 1, wherein the first switching valve and the second switching valve are opened and closed in the alternating manner to one another during an antilocking system engagement at an operating point of 150 bar to 250 bar.

5. The method as claimed in claim 1, wherein the switching valves are switched in such a way that they are open and closed for equally long times.

6. The method as claimed in claim 1, wherein the switching valves are switched in such a way that the first switching valve is open for a shorter time than the second switching valve.

7. The method as claimed in claim 6, wherein the second switching valve is open for twice as long as the first switching valve.

8. The method as claimed in claim 6, wherein, for a same speed, the second hydraulic pump has a higher delivery power than the first hydraulic pump.

9. The method as claimed in claim 8, wherein the second switching valve is open for twice as long as the first switching valve.

10. The method as claimed in claim 1, wherein times in which the switching valves are open or closed are calculated on the basis of a volume model.

11. The method as claimed in claim 1, wherein the first switching valve and/or the second switching valve are or is open for 100 ms to 200 ms.

12. The method as claimed in claim 1, wherein each hydraulic pump has a respective outlet port which is connected to a number of brake cylinders of the respective hydraulic circuit.

13. The method as claimed in claim 12, wherein an inlet valve is arranged between the outlet port and each brake cylinder, and the inlet valves are connected via an isolation valve to the master brake cylinder so as to be situated opposite to the respective brake cylinder;
    and/or
    wherein each brake cylinder is connected via a respective outlet valve to the respective low-pressure accumulator of its hydraulic circuit.

14. The method as claimed in claim 1, wherein the first switching valve and the second switching valve are opened and closed in the alternating manner to one another continuously during operation of the motor vehicle,
    or
    wherein the first switching valve and the second switching valve are opened and closed in the alternating manner to one another in response to:
    a supply voltage of one or both of the hydraulic pumps below a first threshold value,
    a temperature of one or both of the hydraulic pumps above a second threshold value, or
    a current of a motor, which drives the hydraulic pumps, above a third threshold value.

15. The method as claimed in claim 1, wherein the first hydraulic circuit is short-circuited by opening the first switching valve so that fluid can be pumped into the first hydraulic circuit without resistance, and the second hydraulic circuit is short-circuited by opening the second switching valve so that fluid can be pumped into the second hydraulic circuit without resistance.

16. The method as claimed in claim 1, wherein the first hydraulic pump and the second hydraulic pump are connected to different fluid reservoirs of the master brake cylinder.

17. The method as claimed in claim 1, wherein the first switching valve and the second switching valve are opened and closed in the alternating manner to one another during an antilocking system engagement at an operating point of 200 bar.

18. The method as claimed in claim 1, wherein the first switching valve and/or the second switching valve are or is open for 150 ms.

* * * * *